United States Patent [19]

Lewis et al.

[11] 4,351,871

[45] Sep. 28, 1982

[54] DECORATING TEXTILE FABRICS

[76] Inventors: Edward J. Lewis, Underwood, Badger La., Hipperholme, Near Halifax; Ian D. Rattee, 1 St. Catherine's Walk, Leeds LS8 1SB, both of England

[21] Appl. No.: 236,722

[22] Filed: Feb. 23, 1981

[30] Foreign Application Priority Data

| Feb. 15, 1974 | [GB] | United Kingdom | 7100/74 |
| Mar. 4, 1974 | [GB] | United Kingdom | 9653/74 |
| Jun. 21, 1974 | [GB] | United Kingdom | 27778/74 |
| Jun. 30, 1974 | [GB] | United Kingdom | 33618/74 |
| Oct. 9, 1974 | [GB] | United Kingdom | 41473/75 |

Related U.S. Application Data

[63] Continuation of Ser. No. 966,071, Dec. 4, 1978, abandoned, which is a continuation-in-part of Ser. No. 547,484, Feb. 6, 1975, abandoned, Ser. No. 729,037, Oct. 4, 1976, abandoned, Ser. No. 778,157, Mar. 16, 1977, abandoned, and Ser. No. 851,717, Nov. 15, 1977, abandoned.

[51] Int. Cl.³ .................................................. B32B 3/00
[52] U.S. Cl. ...................................... 428/195; 8/468; 156/230; 428/196; 428/197; 428/203; 428/204; 428/207; 428/211; 428/246; 428/914

[58] Field of Search ............... 156/230, 234, 235, 238, 156/240; 428/195, 196, 197, 203, 204, 207, 211, 246, 914; 8/468, 470

[56] References Cited

U.S. PATENT DOCUMENTS

| 1,965,257 | 7/1934 | Poschel | 8/468 |
| 2,556,078 | 6/1951 | Francis | 156/238 |
| 2,911,280 | 11/1959 | Cicogna | 8/468 |
| 3,449,353 | 6/1969 | Porret et al. | 8/468 |
| 4,021,591 | 2/1977 | De Vries et al. | 8/468 |
| 4,037,008 | 7/1977 | Tugwell | 8/468 |

*Primary Examiner*—James J. Bell

[57] ABSTRACT

A method of decorating a fabric is disclosed using a decoration material which contains a thin removable layer which is based on a thermoplastic polymeric film which also has elastomeric properties, and which also contains a dye or pigment. The layer is transferred to the fabric under the action of heat and pressure and subsequently heated further to break the layer down so that it does not adversely affect the handle or feel of the fabric being decorated. The decoration material may contain all of the components necessary to secure transfer of the decoration to the fabric and fixation of the dye or pigment in the fabric to a good degree of wash fastness. Simple heating and pressing treatments are the only ones necessary for effecting decoration.

35 Claims, No Drawings

DECORATING TEXTILE FABRICS

CROSS REFERENCE TO RELATED APPLICATION

This application is a continuation of our application Ser. No. 966,071 filed Dec. 4, 1978, now abandoned which was in turn a continuation in part of our applications Ser. Nos. 547,484 filed Feb. 6, 1975, 729,037 filed Oct. 4, 1976, 778,157 filed Mar. 16, 1977 and 851,717 filed Nov. 15, 1977, all now abandoned.

FIELD OF THE INVENTION

This invention relates to improvements in methods of decorating textile and other flexible materials by the use of transfers and the decoration materials employed.

BACKGROUND TO THE INVENTION

The decoration of textile fabrics and related flexible materials by transferring coloured patterns from an extensible support previously printed with an appropriate design is well known. The methods in use may be put into three distinct categories:

(a) sublimation transfer using heat volatile dyes and components
(b) solvent transfer using a solvent to enable the dyes to diffuse from the printed design on the extensible support to the textile fabric.
(c) melt transfer using heat and pressure to melt a design onto the fabric.

British Patent No. 349,683 (British Celanese Ltd) describes a method falling into the first category in which a non-polar or disperse dye is volatilised from a paper support in contract with a textile material at elevated temperatures. Many patents describe improvements to the processes of manufacture of the decorated paper support. In particular British Patent Nos. 1,190,889 (Trentesaux—Toulemonde S.A.), 1,342,304 and 1,391,012 (Sublistatic Holding S.A.) describe flexible decorated paper supports carrying disperse dyes which vapourise between 160° C. and 220° C. in the presence of heat stable binder for the transfer printing of synthetic textile materials. The method is characterised by a slow transfer of dye from the paper dependent upon the volatilisation and diffusion of the dye so that even at the extremes of usable temperatures near to the melting point of the synthetic textile material transfer requires 30–60 seconds. The slow transfer requires that the decorated paper and the textile be held in contact without relative movement all through the transfer period. This requires the use of special costly machines such as that described in British Patent No. 1,227,681 (Hunt and Moscrop Ltd). In addition both paper and textile fabric must be selected or pretreated so that they do not show more than a limited amount of relative dimensional change during the transfer operation. The system is characterised by considerable commercial and technical attraction but possesses none the less serious inherent disadvantages. The sublimable dyes may diffuse into the flexible paper support instead of into the textile fabric during transfer giving incomplete transfer. The rate of transfer of different dyes is not the same and the sensitivity of transfer rates to the temperature and contact pressure leads to difficulties of control of the process. The process is by its nature restricted to the use of volatile dyes and hence to the more readily sublimed disperse dyes. This leads to a restriction in the application of the process to synthetic fibres notable polyetheylene terephthalate fibres since the fastness achieved on other kinds of synthetic materials is poor. Numerous attempts have been made to overcome these shortcomings. U.S. Pat. No. 3,782,896 (Defago et al) describes the use of a restricted range of disperse dyes which are sublimable and carry substituents capable of reacting with isocyanates to give fast washing colourations. Among other variations masked isocyanates are described which may be mixed with the dyes in the decorating material and which react with the dye after it has transferred to the textile material. Transfer of both dye and its fixing agent is slow and the requirement that the isocyanate reagent react with the dye on the fibre rather than on the transfer paper increases the time necessary so that 60 seconds is a required transfer/fixation time. British Patent No. 1,445,201 (BIP Ltd) describes the treatment of textile fabrics prior to or after sublimation transfer printing with an alkylated melamine formaldehyde resin of appropriate formula. In this way it is claimed good results may be obtained on a variety of fabrics. This process offers a significant disadvantage in requiring a pre - or post impregnation and drying process as well as suffering from the deficiencies of slow transfer, sensitivity to processing variables which it shares with the Defago process. Another means of extending the applicability of sublimation transfer has been described in U.S. Pat. No. 3,995,992 (Ciba Geigy) whereby special derivatives of basic dyes are prepared and used for the sublimation transfer printing of acrylic fibres.

The use of solvent transfer procedures avoids one of the serious limitations of the sublimation procedure i.e. the need for sublimable dyes and the restriction to textile fibres printable with such dyes. Instead of requiring the dye to migrate through the vapour phase in such procedures, the space between the decorating material and the textile is filled with a solvent in which the dyes are soluble and the dye diffuses through it. Such a process is taught in U.S. Pat. No. 1,965,257 (A.B. Pöschel). An improved form of the procedure is described in workable detail in U.S. Pat. No. 2,583,286 (Albini Colombo). Before contacting the decorating material the textile is moistened and the paper and moist cloth are passed through a heated calender. The dyes used were applied to the transfer paper or decorating material from an ink based on linseed oil by standard printing procedures. The ink media are transferred to the textile material by the process so that as a final treatment the textile material has to be washed with hot water to remove unfixed dyes and also treated with fat removing solvents such as trichloroethylene. The process offers rapid transfer i.e. during the very short period of time of contact in the heated calender but suffers serious disadvantages in relation to the efficiency of fixation of the dyes in the absence of any dyeing assistants e.g. acids, bases etc, the need for a pre wetting treatment and the complex washing off procedure using solvents. In another version of solvent transfer British Pat. No. 1,284,824 (Dawson Holdings) describes the use of decorated paper transfer materials held in contact with specially pre-treated fabrics and heated in a moist condition to allow the dye to transfer to the fabric. Unfixed dye and the pre-impregnation solution are then removed by washing. A simpler process is described in British Pat. No. 1,243,223 (Ciba Geigy) which applies the decorated material to the textile and subjects the composite to pressure at an elevated temperature under humid conditions. Necessary ingredients for aiding the fixing of the dyes on the textile fabrics may be included in the decorating inks. Transfer occurs without the use of any binder for retaining the dye on the fabric but transfer is slow i.e. between 10 seconds and 5 minutes. At the end of the humid treatment washing off is essential to remove surplus dye not taken up by the textile. Melt transfer is described most particularly in U.S. Pat. No. 2,911,280 (Cicogna). A special release paper is prepared bearing a coating of waxy materials capable of being printed with an ink similarly constituted but containing dyes appropriate to the textile to be decorated. The printed design is applied to the textile by passing paper and fabric together through a hot calender so that transfer takes place at 150° C. and 100–150 kg/sq.cm. The ink binding substances melt under these conditions and are forced into the interstices of the fabric. In order to fix the dyes the fabric is impregnated before transferring with necessary chemicals and the fabric is steamed after transfer. Special agents are incorporated into the ink to assist the necessary removal of the waxy substances after steaming and this stage removes also any unfixed dye. An improvement of this procedure so as to assist the initial printing process for the production of the paper is described in Dutch Patent Application 7302988 (Dai Nippon Printing Co. Ltd) which incorporates special agents giving greater control over the melting of the ink layer. Although this procedure gives rapid transfer and avoids the problems consequent upon the slow transfer found in sublimation and solvent transfer, melt transfer utilises materials which have to be removed from the fabric at the end of the process. In addition the need to produce a melting system precludes the simultaneous application of dye fixation assistants. Furthermore the process is suitable only for dyes to be fixed by wet processing so that pigment binding and disperse dyes applied by dry heat are excluded.

U.S. Pat. No. 4,021,591 describes iron-on transfers using a polymeric hot-melt layer to transfer the image and bond it to the fabric to be decorated. Such transfers as are described therein are harsh and give an adverse feel to the decorated fabric, see column 5 line 42 to column 6 line 45, where the feel is from "soft leathery" to "relatively stiff or hard". In many applications any increase in stiffness or hardness or feel of the fabric is undesirable.

The purpose of the present invention is to provide a method whereby the several disadvantages of the above methods may be avoided to provide a simpler and more convenient procedure which is based on a different and more effective principle, that of film release transfer. Transfers using this principle are known. For example British Patent No. 1,320,400 (Trentes aux-Toulemonde) describes a hot pressure film release system for the decoration of plastic surfaces. U.S. Pat. No. 3,519,456 (Reed) describes a tacky film release system for transferring images to a receptor surface. However in both of these and related cases it is desired to preserve the transferred film as such on the receptor surface. When the latter is a textile material or a material the surface of which it is undesirable to modify, then the application of a coherent film to it is generally undesirable as the handle, drape, permeability and feel are undesirably modified. In addition a coherent film consisting of a thermoplastic material makes it impossible for the consumer to iron or dry press the article.

Indeed it is a fundamental disadvantage of the majority of prior art decoration processes that the decorated design is present as a more or less continuous film having a very easily perceptible filmy feel to the decorated surface. Thus British Patent Specification No. 1,221,649 discloses a method of applying a pattern to a textile material which comprises transferring a resinous coating under the action of heat and pressure to a textile. Such resinous coatings are thick, typically 75 microns thick, and although the layer is subsequently heated and the resin caused to flow between the fibres of the textile material, the original handle and softness of the material are simply not maintained, despite the assertion in Specification No. 1,221,649 to the contrary.

Likewise, decorating fabrics using transfer films as described in U.S. Pat. No. 2,556,078 does not maintain the original handle and feel of the fabric surface. As noted at column 5 lines 66 to 68 of that specification, the typical thickness of the layer applied is 25 to 50 microns.

We have now found that the original softness, handle and feel of the fabric may be retained by the use of certain selected polymeric materials as a basis for a transferable decoration film and additionally by ensuring that the film is laid down at such a thickness that it may first of all be applied under the action of heat and pressure to a fabric surface and thereafter caused by a subsequent heat treatment to break up into discrete sections. The physical properties of the film forming material and the thickness of the film layer must both be correct in order to achieve the satisfactory and improved results provided by the present invention.

GENERAL DESCRIPTION OF THE INVENTION

We have now found that if the removable decoration layer is sufficiently thin and is laid down on a basis of a polymeric material which is both thermoplastic and elastomeric, very much improved results can be obtained.

Thus, according to the present invention there is provided a method of decorating textile and other fabrics which comprises taking a flexible substrate having a removable film layer thereon of thickness at most 20 microns which is based on a thermoplastic polymeric material having elastomeric characteristics and contains dyes and/or pigments, the polymeric material being one which on heating becomes sufficiently adhesive to the textile fabric to adhere to it under the effect of pressure more strongly than the film layer adheres to the flexible substrate, pressing the film layer onto a textile fabric while heating for a short period of time, removing the flexible substrate to leave the thin film layer adhering to the textile fabric and subjecting the fabric to a hot fixation process whereby the dyes or pigments are fixed to the fabric to give a fast colouration and the thin film layer breaks down to residues not adversely affecting the textile or colour fastness properties of the so-decorated fabric. The flexible substrate can, if desired, be removed after the heat treatment rather than beforehand.

Within the general process a variety of materials may be used for the layer which is applied to the textile to be decorated and the flexible support. There are considerable advantages if the conditions for the transfer of the removable layer to the textile material are relatively mild i.e. the temperature/pressure combination is low as well as the time of its application. Many textile fabrics suffer severe distortion or their surfaces become glazed if they are subjected to excessive pressures and temperatures. For example acrylic materials are known to be deformed if they are subject to high pressures at temperatures much in excess of 80° C. Coated fabrics, e.g. polyvinyl chloride coated fabrics, are seriously affected if the material is not treated carefully. Accordingly it is desirable that the composition of the removable layer and the releasing surface of the flexible substrate are such as to permit transfer to be carried out at low pressures (less than 1000 p.s.i. or 70 kg/cm$^2$ at the point of application), moderate contacting temperatures in the transfer equipment (less than 180° C., preferably 90°-120° C.) and short contact times (less than 5 seconds, preferably 0.01-0.003 seconds). However, in order to achieve good transfer it is preferred to use pressures of at least 20 psi (1.4 kg/cm$^2$) and a temperature of at least 110° C.

It is a feature of the present invention that these desiderata are achieved and all references to transfer conditions or transfer methods in the following refer to processes operating within these limitations.

SPECIFIC DESCRIPTION OF THE INVENTION

The flexible support sheet used in the process of the invention and the materials used in its operation should be one which, while permitting sufficient adhesion of the decorating releasable layer for practical handling purposes, does release the layer readily. This may be achieved by having a hydrophilic/hydrophobic contrast between the surface of the flexible support and the removable layer. The contrast may be achieved by selection of a flexible support with a naturally hydrophilic or hydrophobic surface, for example, a plastics film or metal foil, or it may consist of a flexible material such as paper having an appropriate coating thereon, for example, a silicone or synthetic polybutadiene rubber. Such coated surfaces should be non-porous to the releasable layer when it is applied and may be produced by coating or printing. An alternative method of producing a flexible support with good releasing properties is to coat or print a suitable material such as paper with a solution of a thermoplastic polymer which is incompatible in solution with the film forming polymer used to produce the thin releasable layer. The two layers do not show mixing at their interface thus assisting easy release in the transfer process. Thus a paper may be coated with a layer of an ethyl acrylate/methyl methacrylate copolymer which is incompatible in solution with a release layer consisting substantially of polyvinyl butyral. As examples of suitable materials for flexible supports for use in the process of the invention may be quoted cellulose acetate and polypropylene films, metal foils, e.g. aluminium foil, paper coated with silicones, polypropylene, acrylic copolymers, paraffin wax, polybutadiene, clay/latex emulsions and polyamides.

The releasable layer used in the preparation of materials for use in the process of the invention contains appropriate colouring matters, thermoplastic film forming polymer with elastomeric properties and other materials which assist in the fixation of the colouring matters on the textile material or modify the behaviour of the polymer film. Textile materials are generally hydrophilic in nature and consequently better results are usually obtained if the film forming polymer has some hydrophilic character as this promotes its adhesion and wetting of the textile.

The preferred polymeric base materials for use in the process of the present invention which fulfil the desiderata just noted are polyvinyl butyral and polyvinylidene chloride. The film forming layer may contain, in addition to the thermoplastic polymer with elastomeric properties, a proportion of the thermoplastic polymer compatible therewith, although not elastomeric. The proportion of such second polymer which may be included is generally less than 25% by weight of the total thermoplastic polymer, and in any case must not adversely affect the behaviour of the thin layer. However it is desirable to include other thermoplastic materials sometimes to improve the rheological properties of the coating composition or printing ink from which the layer is laid down. Example 7 below incorporates such an additional polymer.

With these film forming polymers relatively hydrophobic flexible supports are preferably employed. The colouring matters employed in the thin removable layer are those which are appropriate to the textile material to be decorated. Thus for cellulosic textiles removable layers containing fibre reactive, direct or vat dyes are preferred. For wool textiles the removable layer will contain fibre reactive, acid or acid milling dyes. For polyamide textiles disperse dyes as well as fibre reactive, acid or acid milling dyes are used. For acrylic textiles disperse or basic dyes are employed and for polyester textiles disperse dyes are used where the textile material is expected to be mixture of textile fibres, then an appropriate mixture of dyes can be employed. In a further special feature of the invention the releasable layer may contain pigments. No restrictions have been found as to chemical class and dyes or pigments of all kinds may be employed including azo, di-azo, anthroquinonoid, polynuclear, inorganic and other colouring matters. Optical brightening compounds, for example stilbene compounds, may also be used.

In such cases, the releasable layer preferably comprises a base of thermoplastic film forming polymer material together with one or more pigments, a cross linking agent capable of cross linking the thermoplastic polymer, a catalyst promoting the cross linking reaction, a high temperature plasticiser and optionally other materials assisting the application of the removable layer to the flexible substrate in the first instance. The catalyst is preferably a thermally activated catalyst e.g. a blocked catalyst.

The releasable layer may contain more than one pigment and the pigment(s) may be inert or capable of reacting with the polymer and/or the cross linking agent.

Such a material is used by bringing it into contact under heat and pressure with the material to be decorated, usually a textile fabric, in order to adhere together the releasable pigment-containing layer and the material to be decorated and thereafter subjecting the material to a fixation treatment which fixes the pigment to the material and breaks down the transferred layer as explained in more detail below so that the properties of the material are not significantly modified by the presence of its residues. The use of a thermally activated catalyst makes it possible, using the techniques described in more detail below, to use heat and pressure sufficient to initiate the fixing which can then be allowed to go to completion in time, e.g. a few days, while the material to be decorated is simply stored. The flexible substrate may be removed prior to the fixing treatment or afterwards. Generally if it is to be removed after the fixing treatment a higher combination of temperature and pressure is required in the initial contacting treatment than if the flexible substrate is removed prior to the fixing treatment. In certain circumstances it is advantageous to remove the flexible substrate after the fixing treatment to minimise the risk of contamination of parts of the machinery by pigment and removable layer materials. The initial heat and pressure contacting may be of a very short duration making it possible to achieve transfer and optionally fixation also by a single passage through heated nip rollers i.e. an application of heat and pressure of the order of $10^{-2}$ or $10^{-3}$ seconds.

As noted above, the catalysts used to promote the cross linking action are preferably thermally activated. This means that they are ineffective at normal ambient temperature, and so do not tend to cross-link the polymer compound of the decoration material during its manufacture or storage, giving that material a good shelf-life. The temperature at which the catalyst may be activated may vary, but is preferably greater than 100° C. Activation may take place by a heating treatment subsequent to transfer of the removable layer to the material to be decorated or simultaneously therewith.

Preferred temperature activated catalysts are so-called "blocked" catalysts, particularly the amine salts of strong acids, e.g. the ethanolamine or diethanolamine salts of mineral acids. The activity of these amine salts depends upon the dissociation of the salt. Until a critical temperature is reached the catalyst has no significant effect in the removable film. The amine salts of p-toluene sulphonic acid are of especial value in this connection enabling the critical initiating temperature to be raised to as high as 120° C. with corresponding advantages in the heat stability of the releasable layer, the flow of the layer during transfer and the extent of thermal breakdown of the removable film during transfer and heat fixation. Suitable amine compounds for combination with p-toluene sulphonic acid include S-carbazide, mono- and di-ethanolamine.

It is particularly desirable to utilise a catalyst/cross linking agent combination that gives a precise temperature threshold for cross linking. Since during the course of forming the removable layer on the flexible substrate by coating or printing, for example, it may be necessary to heat the paper in order to remove solvents; it is important that no cross linking reactions are initiated by such heating. During the transfer process, when heat and pressure are applied, they should initially be sufficient only to ensure that the materials of the removable layer flow readily without the development of the viscosity which is characteristic of the onset of cross linking; however, at the end of the transfer process, the heat and pressure may rise to activate the catalyst.

In one aspect, the present invention provides printing inks comprising pigments and other ingredients to form the releasable layer, dissolved or dispersed in an appropriate solvent. Specifically inks according to the present invention comprise an ink vehicle of a thermoplastic polymeric film forming material capable of being cross linked, a cross linking agent capable of cross linking the polymeric film forming material, a pigment or pigments, a catalyst promoting the cross linking reaction and a high temperature plasticiser as outlined above.

Such inks can be formulated according to normal ink making practice and can be adjusted in their consistency to the particular method of application required. It is important to avoid excessive heat during ink formulation so that no initiation of cross linking occurs and also to avoid the use of acidic materials as additives for the same reason.

When the thin releasable layer is formed in the printing process a solution containing the film forming polymer dries by evaporation. During this process the polymer chains become arranged in a thin layer across the surface of the flexible support and during the evaporation a physical attachment is developed which retains the film on the surface of the support. By the use of appropriate polymer molecules which contain bulky substituent groups and which are chemically inert the film which is formed is in a metastable state. The physical form of such films is maintained partly due to the lack of mobility of the polymer molecules at normal temperatures and partly due to the tactile stabilisation provided by whatever is supporting the film. When the later has a smooth even surface a film of excellent stability even on warming is obtained. However if the film is transferred by, for example heat and pressure followed by peeling away the flexible support to a textile material it then finds itself only intermittently attached to its new support due to the uneven surface of woven or knitted fabrics. Thus if such a transferred film is then heated so as to promote mobility in the polymer molecules, the film is able to adopt a more closely packed or stable form. If the film is thin as in the present instance it lacks sufficient strength to sustain the contraction forces so that it breaks up into discrete particles in a discontinuous distribution. This process as well as the process of release from the flexible substrate is greatly assisted by the presence in the thin releasable layer of high temperature plasticisers, particularly those which facilitate wetting of the textile fibres by the softened polymer. It is obvious that if the film forming polymer melts in transfer or does not soften after transfer this property of thermal destructibility is not observed and the advantages of the present invention are not obtained. Suitable high temperature plasticisers include polyethanoxy compounds and condensates, for example stearyl alcohol-ethylene oxide condensate, carbowax ethylene oxide condensates, fatty acids such as palmitic or stearic acids, stearamide or finely dispersed polyethylene. By adjusting the relative concentrations of film forming thermoplastic polymer and high temperature plasticiser both the rate and extent of thermal break down of the transferred film may be controlled to within appropriate limits. Generally the relative amounts of high temperature plasticiser and film forming polymer fall into the range 0.24–2 parts of high temperature plasticiser to each part of film forming polymer. Notwithstanding the effect of high temperature plasticisers on the behaviour of the releasable film during transfer and fixation processes, the characteristics of the film forming polymer in terms of its intrinsic flow properties, flexibility etc are important. If materials of high molecular weight e.g. 180,000–200,000 are used, the viscosity of the polymer, even when softened, is often inadequate to achieve the appropriate degree of thermal instability in the transferred film. Furthermore such high molecular weight polymers tend to produce an undesirable stiff finish on the textile. When using polyvinylbutyral as the film forming polymer, great advantage is gained if material with a molecular weight of 30,000–34,000 is used as compared with material in the range 180,000–200,000. In the case of polyvinyl butyral the heat distortion temperatures of materials in these two ranges are 45°–55° C. and 56°–60° C. and the flow temperatures at 1000 psi pressure are 105°–110° C. and 145°–155° C. respectively. The viscosity of the polymer during the thermal breakdown stage is also felt to play an important part.

High temperature plasticisers constitute a special sub-group of plasticisers and have the property of lowering the temperature of the rubber/salt transition. They may or may not also possess the property of normal plasticisers i.e. lower the temperature of the glass/rubber transition to give a softer more pliable film. Since the process of decoration requires that the continuous nature of the transferred film does not survive the fixation process normal plasticisers have no significant role to play. However high temperature plasticisation improves the extent of penetration of the releasable film into the receiving substrate during transfer and the continuation of that process during the subsequent fixation treatment.

The transfer of dye from the released layer to the textile material is greatly enhanced by incorporating appropriate dyeing assistants in the thin film. These must be selected so as to enable a satisfactory releasable layer/flexible support composite to be prepared which is dry and can be handled. For example the incorporation of acid substances e.g. tartaric acid is of great assistance when basic dyes are present. Such substances also assist in the fixation of acid dyes by wool or nylon.

The presence of alkali e.g. sodium carbonate is necessary when applying films containing reactive dyes to cellulosic fibres. Agents such as ethylene carbonate, propylene carbonate, phenolic compounds may be incorporated in the film to promote swelling of the textile material and dye diffusion. Agents promoting the solubility of the dyes may also be used e.g. glycols may be used to assist the dissolution of disperse dyes.

A particular feature of the invention is that by the use of appropriate additives to the releasable layer, pigments may be bound to the textile substrate to give a fast result.

The application of pigments to textiles in association with cross linking polymer system is well known using conventional padding or direct printing techniques. Using the procedure of the present invention the rate of thermal breakdown of the transferred film can be controlled by the use of high temperature plasticiser in combination with a cross linking agent capable of cross linking the film forming polymer and suitable catalyst. Thus the film forming may be converted into a pigment binding system while at the same time the degree of physical breakdown of the film necessary for the preservation of the textile properties of the material i.e. handle, drape, etc. is achieved. Suitable cross linking agents includes methylol urea and methylol cyclic ureas, methylol melamine and esters such as methoxy methyl melamine, methylol triazones, glyoxal etc. Bifunctional urethanes may also be used. As catalysts, zinc nitrates, ammonium dihydrogen phosphate and other acid generating materials may be used. Of particular value are the so called "blocked" catalysts as explained above. When a cross linking system involving acid catalysis is used it is clearly undesirable to use flexible support materials with an excessively acid reaction as this can lead to polymerisation or cross linking on the support during storage or during the drying operations associated with the application of the release layer. Alternatively it is possible to incorporate into the acid forming catalyst composition an excess of base to ensure that no acid reaction occurs on the flexible support material.

The decorating material for use in the process of the invention may be prepared by a variety of means including coating and/or printing. The releasable layer may be continuous or discontinuous and when the latter applies it is most conveniently applied by printing using flexographic, gravure or screen printing to deposit a print of a desired thickness of less than 20 microns. Gravure printing techniques usually deposit a film of dried thickness 2 to 3 microns, and screen printing techniques a film of dried thickness 12 to 15 microns.

The composite of the coated flexible support can be built up in any desired way and need not consist simply of one or two layers. Similarly when a multiplicity of sublayers constituting the transferable layer, the various components to be transferred can be distributed in any desired way among the sublayers. The essential features of the removable layer are that it should be less than 20 microns thick and that it should contain, either throughout or in at least one of its sub-layers or in the combination of such sub-layers, the components previously described as necessary components of the removable layer. For example in the application of basic dyes to acrylic fibres by the method of the invention suitable basic dyes may be incorporated in one layer in the decorating material and an acid dyeing assistant in another layer, both layers being removable. Alternatively in decoration materials prepared for the transfer and fixation of pigments by the method of the invention, the acid forming catalyst may be contained in one releasable layer and the pigments, crosslinking agent etc. incorporated in a second such layer.

When a flexible support coated with a thermoplastic layer is used it is found that some of the coating is transferred along with the releasable layer. It is possible in such cases to regard the thermoplastic layer in such cases as a sub-layer of the releasable layer and necessary components may accordingly be incorporated in it. The use of a plurality of sub-layers may in certain circumstances offer particular advantages when it is desired to use particular printing methods. For example printing by lithography requires inks to possess particular properties in relation to their physical reactions with the lithographic plate. To achieve a satisfactory balance of such properties is not easy when the inks also require to possess properties and contain substances such as have been discussed. However by coating or printing the flexible substrate using any appropriate means with a releasable film comprising all of the ingredients necessary to the present invention, drying the coated substrate and then printing the design using a lithographic ink, a suitable decorating material can be built up. It may be advantageous with some lithographic inks to apply over the printed decoration a further coating similar in composition to the first in order to achieve the best transfer properties and fastness. It is particularly advantageous when lithographic inks are printed to use a thermoplastic base material such as is provided by ultra violet cured inks based on glycidyl methacrylate. Similarly in gravure printing good image production is dependent upon the acceptance of the ink receiving surface of the ink in the engraved cells and the ability of the printed dots to flow together to give overall coverage. To assist in this process the removable layer system of the present invention it may be advantageous previously to coat the flexible support with an overall removable coating of similar properties. Such coatings may be applied by coating or by printing in the same printing operation as that in which the coloured decoration is applied to the flexible support.

In the production of the decoration materials by any conventional mode of printing, the formation of a plurality of layers is in any case inevitable in multicolour printing processes since the coloured decoration is built up by successive printing with different colours, mixture shades often being produced by laying one printed coat on another. It is important when using an ink for the production of the decorating materials that is heat curable, e.g. for the version of the process which uses pigments bound to the textile material by cross linking materials, to avoid the use of drying temperatures which may initiate the cross linking reaction or cause the high temperature plasticiser to become operative. In the first case this may lead to papers with poor storage stability as cross linking may proceed for a time after heating ceases. In the second case a tacky paper will be produced which cannot be stacked without adherence of separate sheets or layers in a roll of printed paper. The latter proviso will apply to all decorating materials produced with a high temperature plasticiser in the ink whether it is heat curable or not. When heat curable releasable films are to be applied it is desirable to avoid the use of flexible supports with an acid reaction as such residual acidity can lead to curing on storage and a loss of desirable properties. Particular care should be taken to ensure that paper backings are not too acid.

The transfer of the releasable film from the paper to the textile may be carried out by any appropriate means. Most conveniently the decorated flexible support is brought into contact with the textile material so that the decorated surface is next to the latter and the composite passed through heated calender rollers. The flexible support is then removed from the textile material to leave the transferred decoration. The temperature of the heated calender rollers, the pressure applied and the running speed may be varied according to the circumstances. The textile fabric may optionally be heated before being brought into contact with the decorating material in order to reduce the moisture content therof; indeed, generally it is preferred that the fabric to be decorated be as dry as is practicable and a pre-drying step is in some cases desirable.

Since satisfactory transfer depends upon the achievement of an appropriate temperature and degree of contact at the decoration layer and the textile interface, the temperature of the heated rollers will vary with the thermal conductivity of the textile or the paper, the thickness and the running speed of the equipment. Certain materials became heat deformable at quite low temperatures for example certain textiles made from acrylic fibres. In such cases it is desirbale to use either low transfer temperatures (80°–90° C.) or to run at high speed giving short contact times. The production of a suitable decorating material for such materials requires careful choice of release layer composition and also the nature of the surface of the flexible surface. Transfer can also be carried out using a static press. Generally speaking these give lower pressures than do calender rollers and results are generally less satisfactory in terms of efficiency and penetration. Short contact times are still employed as no advantage is gained by prolonging them. Due to the mild conditions employed and the efficiency of transfer using the process of the invention used transfer paper may be reprinted for re use if desired.

The removal of the flexible support after the heat/pressure treatment may be carried out immediately or after a short delay. It is necessary before removal of the flexible support for the tensile strength of the releasable film to be restored to a sufficient level for easy and efficient transfer. When large amounts of high temperature plasticises are present for any reason it is often found advantageous to allow 5–10 seconds cooling between the heat/pressure treatment and removal of the flexible support. Generally it is better to utilise a formulation of the releasable layer which does not require such a cooling period, or to adjust the transfer conditions appropriately.

Afer transferrng the decoration to the textile fabric, the colour is fixed by an appropriate heat treatment. Thus three general kinds of fixation procedure may be employed. Where the dyes used possess water solubility or their adsorption may be promoted by aqueous conditions, the textile material may be steamed for an appropriate period. In some cases using selected dyes the fixation or adsorption of dye by the fibre will be sufficient for the material to be simply dried after steaming and a decorated fabric of satisfactory fastness obtained. In other cases dye fixation will be insufficient and a washing off procedure will be necessary to remove loose dye. Generally selected dyes giving fastness without subsequent washing are preferred. Disperse dyes may be fixed by stemming or by baking the textile material. High pressure steaming or superheated steam may be employed. Generally dry fixation is achieved at temperatures between 180° C. and 220° C. Heating may be by any appropriate means including hot air or microwave heating. When a heat curable ink system containing pigments has been used, the decorated fabric is heat cured in an oven at a temperature between 130° C. and 200° C. preferably 150°–185° C. for 30–60 seconds. The textile materials decorated by the process of the invention cover a wide range and include cellulosic, protein, polyamide, polyacrylic, polyester, cellulose ester, polypropylene based textiles and also textiles made up from blends of fibres. The textile materials may be woven or non woven and they may be coated for example with polyvinyl chloride. Analogous materials which may be decorated include leather and simulated leather materials.

SPECIFIC EXAMPLES OF THE INVENTION

The following Examples will serve to illustrate the invention throughout, parts are by weight unless otherwise stated, and temperatures are given in °C.

EXAMPLE 1

An ink containing in each 100 parts,
12 parts of polyvinylbutyral
6 parts of Maxilon Red MRL (Ciba-Geigy)
3 parts of tartaric acid
3 parts of stearol-ethyleneoxide condensate
76 parts of N-propanol and is printed onto a silicone release paper by rotary screen printing using a drying temperature of 70° C., to give a dry printed layer of thickness 10 microns. The paper is brought into contact with a woven acrylic fabric and the composite is passed between heated rollers operating at a surface temperature of 100° C., a pressure of 150 lbs per linear inch of nip contact and a running speed of 10 yds. min$^{-1}$. The silicon release paper is removed leaving the printed design on the fabric which is then steamed at 102° C. for 20 minutes. The fabric is then dried. It is decorated with a red design which is fast to washing, perspiration rubbing and to light.

If the dye is replaced by Maxilon Blue M2G (Ciba Geigy) a blue decoration is obtained which also possesses excellent fastnes properties.

EXAMPLE 2

An ink containing in each 100 parts
15 parts of polyvinyl butyral
6 parts of copper phthalocyanine pigment
12 parts of stearol-ethylene oxide condensate
4 parts of trimethoxy methyl melamine
1 part of p-toluene sulphonic acid-monoethanolamine salt
62 parts of 64 op ethanol
and a solution containing in each 100 parts
30 parts ethylacrylate/methylmethacrylate copolymer
10 parts castor oil
60 parts ethylacetate.
are prepared.

The solution and the ink are printed onto a good quality 55g·m$^{-2}$ paper in sequence by gravure printing using a drying stage after each application operating at 80° C. The solution is applied first using an overall coverage of the paper and the coloured ink is applied as a design. Each layer is 2 microns thick when dried. The printed paper is brought into contact with a woven cotton fabric and the composite passed between heated rollers operating at a surface temperature of 140° C., a pressure of 175 lbs per linear inch or nip contact and a running speed of 15 yds. min$^{-1}$. The paper is peeled from the fabric leaving the decorated design. The fabric is then heated in an oven at 160° C. for 45 seconds. The cotton fabric is then decorated with a fast blue design and has a soft handle.

If the copperphthalocyanine pigment is replaced by the following pigments the coloured decorations indicated are obtained.

Carbon black . . . black
C.I.Pigment Yellow 3 . . . greenishyellow
C.I.Pigment Yellow 31 . . . lemon yellow
C.I.Pigment Orange 6 . . . reddish orange
C.I.Pigment red 9 . . . Yellowish red
C.I.Pigment Green 13 . . . Yellowish green.

Alternatively the number of sequential printing operations can be increased, providing that the first operation is that using the solution, to provide multicoloured decorating materials and decorated textile fabric.

EXAMPLE 3

An ink containing in each 100 parts,
15 parts of polyvinyl butyral
6 parts of C.I. Pigment Red 1
15 parts of stearol-ethylene oxide condensate
4 parts of tri methoxymethyl melamine
1 part of ammonium nitrate
31 parts of polyethylene glycol 200
31 parts of diacetone alcohol.
is prepared.

The ink is applied to a silicone release paper by flat bed screen printing using a drying temperature of 65° C. to give a dried printed layer of thickness of 12 microns. The printed paper is then applied to a cotton interlock material and the composite passed between heated rollers operating at a surface temperature of 140° C. a pressure of 135 lbs per linear inch of nip and a running speed of 10 yards min$^{-1}$. The paper is then peeled from the fabric which is then heated in an oven at 165° C. for 60 seconds. The knitted fabric is decorated with a red design of excellent fastness.

EXAMPLE 4

An ink is prepared which contains in each 100 parts
10 parts C.I. Disperse Red 1
8 parts Carbowax 1500
12 parts Polyvinyl butyral
70 parts 64 OP ethanol.
and is printed onto polypropylene coated paper using a gravure roller to give a final dry ink thickness of 3 microns. The paper is contacted with a woven polyester fabric and the composite passed between heated rollers operating at a surface temperature of 120° C., a pressure of 120 lbs per linear inch of nip and a running speed of 10 yards min$^{-1}$. The coated paper is peeled from the fabric immediately the composite leaves the nip and the decorated polyester fabric heated by passing it over an oil heated drum at a surface temperature of 210° C. using a contact time of 15 seconds. The fabric is printed with a red design of good fastness.

EXAMPLE 5

An ink is prepared which contains in each 100 parts
5 parts C.I. Acid Red 1
5 parts Tartaric Acid
10 parts Stearamide
15 parts polyvinyl butyral
55 parts n-propanol
10 parts diacetone alcohol
and printed onto a paper, coated with butylmethacrylate cured by ultra violet irradiation, using rotary screen printing to give a dried film thickness of 8 microns. The paper is contacted with a nylon voile fabric and the composite passed between heated rollers as in Example 1. The paper is then removed leaving a red film on the fabric surface such that its original openness of construction has been lost. The fabric is then steamed for 30 minutes at 102° C. and dried. The original open construction of the fabric is observed to have been restored and the nylon material coloured to a bright red shade of good fastness.

EXAMPLE 6

An ink is prepared in each 100 parts
5 parts Lanasol Red 6G (Ciba Geigy)
2 parts Lactic acid
8 parts stearamide
12 parts polyvinyl butyral
63 parts 64 OP ethanol
and printed onto a paper coated with an isobutyl methacrylate copolymer by gravure printing to give a printer layer thickness of 3 microns. The paper is brought into contact with a fine chlorinated wool delaine fabric and the composite passed between heated rollers as in Example 3. The paper is removed, the wool steamed for 20 minutes at 102° C. and dried. The wool is decorated to a red shade of high washing fastness.

EXAMPLE 7

An ink containing in each 106 parts
13.8 parts of polyvinylidenechloride
1.2 parts of ethylacrylate polymer
14 parts of tearol ethylene oxide condensate
5 parts of a 20% aqueous solution of N-methylol 4-methoxy 5-dimethyl hexahydropyrimidone-2
1 part of p-toluene sulphonic acid-monoethanolamine salt
65 parts of tetrahydrofuran
6 parts of C.I. Pigment Red 9 is prepared and printed by gravure printing to give a wet film thickness of 6 microns onto a release paper coated with a Werner chromium complex with myristic acid and marketed as Quilon "C" by E. I. Du Pont de Nemours. The printed paper is brought into contact with a woven cotton fabric and subsequently processed as described in Example 2. The fabric was decorated with a red design with a soft handle and fastness to washing.

EXAMPLE 8

2 gms of a finely divided carbon black pigment
15 gms of polyvinyl butyral (Butvar 98 - Monsanto Co.)
10 gms of stearyl alcohol - ethylene oxide condensate
2 gms of trimethoxy methylmelamine
1 gm of the monoethanolamine salt of p-toluene sulphonic acid
2 gms of Bentonite are dispersed in a mixture of 50 parts of polyethylene glycol 200 with 18 parts of diacetone alcohol to form a screen printing ink. A paper coated with a silicone release layer is printed with the ink by screen printing and dried at 75° C. The printed paper is then used to decorate a cotton fabric by passing the paper in contact with the fabric through heated callender rollers operating at a pressure of 70 lbs per linear inch of nip with one roller heated to a temperature of 95° C. The speed of passage is 20 meters per minute. The paper is then peeled from the cotton fabric leaving the printed design thereon. The fabric is then heated for 30 seconds in an oven at 140° C. After the heat treatment the fabric is decorated with a fast black design. The fastness is found to improve on standing to an even higher standard giving excellent fastness to the I.S.O. No. 4 washing tent.

EXAMPLE 9

If in Example 8, the carbon black pigment is replaced by a red pigment (C.I. Pigment Red 6) and the design is printed by screen printing onto a wax coated paper. An excellent transfer of the design onto a rayon fabric is achieved by increasing the callender pressure to 115 lbs per linear inch and the temperature of the heated roller to 110° C. The fastness of the decoration after heat treatment as described in Example 8 is excellent.

EXAMPLE 10

An ink made up as shown in Example 8 is applied by screen printing to a wax coated paper which is then used to decorate a cotton fabric by passing the paper in contact with the fabric between heated calender rollers at a pressure of 100 lbs per linear inch of nip with one roller heated to a temperature of 190° C. and with a running speed of 1 yard per minute. The paper is then peeled from the fabric. After storage for 7 days the fastness of the decoration is greatly improved over that which may be observed immediately after the paper is peeled.

EXAMPLE 11

A coating solution of 15 parts of polyvinylbutyral dissolved in 85 parts of n-propanol is applied to a paper coated with an ultraviolet radiation cured butylmethacrylate composition containing a suitable photochemical initiator and dried. The polyvinylbutyral coating is applied at a wet thickness of 6μ.

The coated paper is printed with a conventional lithographic ink containing a copper phthalocyamine pigment using normal procedures and then coated again with a solution containing
15 parts of polyvinyl butyral
10 parts of stearyl alcohol
2 parts of trimethoxy methyl melamine
1 part of the diethanolamine salt of p. toluene sulphonic acid dissolved 72 parts of n-propanol and dried at 50° C. The wet thickness of the second coating is 6μ.

The printed paper is then used to decorate a cotton/polyester blended shirting fabric by bringing it into contact with the fabric and passing the composite through a heated callender set at a pressure of 70 lbs per linear inch and the temperature of the heated roller at 100° C. After passage through the callender the paper is removed leaving the decorating design on the fabric. The latter is then heated for 45 seconds at 135° C. to give a blue decoration of very high fastness to severe washing and to light.

EXAMPLE 12

A glazed bleached kraft paper is coated to a thickness of 36μ using a solution containing:
30 parts of a polyamide resin
10 parts of stearamide wax
3 parts of stearol-ethylene oxide condensate
and then dried.

The coated paper is then printed by screen printing with an ink containing in each 100 parts,
5 parts of finely divided carbon black pigment
15 parts of polyvinyl butyral
10 parts of stearol-ethylene oxide condensate
1 part of monoethanolamine salt of p-toluene sulphonic acid
2 parts of a 50% aqueous solution of methylol methoxy dimethylhexahydro pyrimidone dissolved in 50 parts of diacetone alcohol and 17 parts of polyethylene glycol 100. The dry film thickness of the printed ink layer is 12–15μ. The decorated paper is brought into contact with a cotton interlock fabric and the composite placed in a transfer printing press operating at 195°–200° C. and a pressure between the plates of 3–4 p.s.i. for 35 seconds. The composite is then removed and the paper peeled from the fabric. The black design is transferred almost completely from the paper to the fabric giving a soft permeable decoration with high fastness to light, washing and cracking.

During the transfer process the releasable ink film is transferred to the fabric and is detached from the support sufficiently for physical breakdown to occur without the need to remove the flexible support.

We claim:

1. In a method of decorating a fabric which comprises taking a flexible substrate having a removable layer thereon which contains at least one dye or pigment in a film-forming polymeric base, bringing the flexible substrate with the removable layer thereon into contact with the fabric to be decorated under the action of heat and pressure, whereon the removable layer becomes more adherent to the fabric than to the flexible substrate, removing the flexible substrate to leave the removable layer adherent to the fabric and heating the assembly comprising the removable layer with the fabric, the improvement which comprises the removable layer being formed of a thin film of thickness at most 20 microns and on the basis of a thermoplastic polymeric material having elastomeric characteristics, heating the said assembly to a temperature sufficient to cause physical break-down of the thin removable layer so that it breaks up into discrete particles in a discontinuous distribution, but not sufficient to cause damage to the fabric, whereby the dyes or pigments become fixed to the fabric to give a fast coloration and the thin film layer breaks down to residues in discontinuous form not adversely affecting the fabric or color fastness properties of the so decorated fabric.

2. The method of claim 1 wherein the heating step to cause break-down of the removable layer is a dry heating step.

3. The method of claim 1 wherein the heating to break down the removable layer is to a temperature of 100° to 200° C. and for a duration of up to 30 seconds.

4. The method of claim 1 wherein the assembly of the removable layer and the fabric is allowed to cool between the initial application of heat to adhere the removable layer to the fabric and the subsequent application of heat to cause physical break-down of the removable layer.

5. The method of claim 4 wherein the assembly is allowed to cool for a period of 2 to 20 seconds.

6. The method of claim 1 wherein the removable layer is initially adhered to the fabric by passing the assembly of flexible substrate removable layer and fabric through a heated nip in which the assembly is subjected to a pressure of at least 20 lbs/inch$^2$.

7. The method of claim 1 wherein previous to its being decorated the fabric is dried.

8. The method of claim 1 wherein the decoration material and the substrate to be decorated are brought together between heated calender rolls under a line pressure of 40 to 200 lbs/linear inch of roller width.

9. The method of claim 1 wherein the substrate to be decorated is a textile fabric and the fabric and the decoration material are passed through heated calender rolls at a speed of at least 5 m/minute.

10. In a method of decorating a fabric which comprises taking a flexible substrate having a removable layer thereon which contains at least one dye or pigment in a film-forming polymeric base, bringing the flexible substrate with the removable layer thereon into contact with the fabric to be decorated under the action of heat and pressure, whereon the removable layer becomes more adherent to the fabric than to the flexible substrate, optionally removing the flexible substrate to leave the removable layer adherent to the fabric, and heating the assembly comprising the removable layer with the fabric, the improvement which comprises the removable layer being formed of a film sufficiently thin and of sufficient physical properties on the basis of a thermoplastic polymeric material having elastomeric characteristics that heating the said assembly to an intermediate temperature, greater than the transfer temperature but less than a temperature at which the fabric is damaged, causes physical breakdown of the thin removable layer so that it breaks up into discrete particles in a discontinuous distribution, heating the assembly to said intermediate temperature whereby the dyes or pigments become fixed to the fabric to give a fast coloration and the thin film layer breaks down to residues in discontinuous form not adversely effecting the fabric or color fastness properties of the so decorated fabric.

11. A fabric decoration material comprising a flexible substrate and at least one layer transferable from the substrate to a fabric to be decorated, wherein the transferable layer has a thickness at most 20 microns, contains at least one colorant material selected from the class consisting of dyes and pigments, contains at least one additive which serves to assist the fixation of the colorant material in the fabric under the effect of heat and is in the form of a film which is based on a thermoplastic polymeric material having elastomeric characteristics which may be caused under the effect of heat and pressure to adhere more strongly to a fabric to be decorated than to the flexible substrate, and which when transferred to a fabric under the action of heat and pressure and subsequently heated to a temperature below that at which the fabric may be damaged undergoes physical breakdown from its film form into discrete particles in a discontinuous distribution whereby to form a discontinuous decoration on the fabric surface.

12. The decoration material of claim 11 wherein the flexible substrate has a hydrophobic surface and the transferable layer is of hydrophilic character.

13. The decoration material of claim 11 wherein the transferable layer is based on polyvinylbutyral.

14. The decoration material of claim 11 wherein the transferable layer has been applied by a gravure printing press and is of thickness 2 to 5 microns.

15. The decoration material of claim 12 wherein the surface of the flexible substrate is of a material selected from the class consisting of silicones and butadiene rubbers.

16. The decoration material of claim 11 wherein the additive is a high temperature plasticiser selected from the class consisting of polyethanoxy compounds and condensates, high molecular weight fatty acids and fatty acid derivatives and polyethylene.

17. The decoration material of claim 11 wherein the colorant material is a pigment and the layer includes a cross-linking material for the polymeric base material.

18. The decoration material of claim 17 wherein the cross-linking agent is selected from the class consisting of methylolurea, methylolcyclic ureas, methylolmelamine, methoxy methyl melamine, methylol triazones, glyoxal and bifunctional urethanes and methylol methoxy dimethyl hexahydro pyrimidone.

19. The decoration material of claim 17 which further includes a catalyst for the cross-linking reaction.

20. The decoration material of claim 19 wherein the catalyst is a blocked catalyst.

21. The decoration material of claim 11 wherein the colorant is a dye-stuff and wherein the layer contains at least one dyeing assistant proper to the respective dye-stuff.

22. A fabric decoration material comprising a flexible substrate having printed thereon a removable layer based on a film-forming polymeric polyvinylbutyral composition, containing a colorant material selected from the class consisting of dyes and pigments, containing appropriate additives to fix the colorant material on the fabric to be decorated, if necessary in combination with the polyvinylbutyral base of the removable layer, the layer being adherable to a fabric to be decorated under the action of heat and pressure more strongly than the layer is adhered to the flexible substrate, and which when transferred to a fabric under the action of heat and pressure and subseqently heated to a temperature below that at which the fabric may be damaged is sufficiently thin that it undergoes a physical breakdown from its film form into discrete particles in a discontinuous distribution to form a discontinuous decoration on the fabric surface.

23. The decoration material of claim 20 and including a high temperature plasticiser.

24. The decoration material of claim 20 wherein the removable layer contains at least one pigment capable of reacting with the polymer.

25. The decoration material of claim 20 wherein the removable layer contains at least one pigment capable of reacting with the cross-linking agent.

26. The decoration material of claim 20 wherein the catalyst is selected from the class consisting of amine salts of strong mineral acids.

27. The decoration material of claim 26 wherein the catalyst is an amine salt of p-toluene sulphonic acid.

28. The fabric decoration material of claim 11 in which the transferable layer comprises the printing ink of claim 1.

29. A printing ink for use in the manufacture of decoration materials and comprising an ink vehicle of a thermoplastic polymeric film-forming material capable of being cross-linked, a cross-linking agent capable of cross-linking the polymeric film-forming material, at least one pigment, a thermally activated catalyst promoting the cross-linking reaction between the thermoplastic polymeric film-forming material and the cross-linking agent and selected from amine salts of acids and a high temperature plasticiser.

30. The ink of claim 29 wherein the thermoplastic polymeric film-forming material is polyvinylbutyral.

31. The ink of claim 29 wherein the cross-linking agent is a dialdehyde.

32. The ink of claim 29 wherein the cross-linking agent is a methylolated aminoplast monomer.

33. The ink of claim 32 wherein the cross-linking agent is selected from the class consisting of dimethylolurea, dimethyloldihydroxyethyleneurea, dimethylolcyclic ethylene urea, methylolated melamine and trimethoxymethylmelamine or methylol methoxy dimethylhexahydro pyrimidone.

34. The ink of claim 29 wherein the catalyst is an amine salt of p-toluene sulphonic acid.

35. The ink of claim 29 wherein the high temperature plasticiser is selected from the class consisting of high molecular weight fatty acids, esters of high molecular weight fatty acids with polyethylene glycol, esters of high molecular weight fatty acids with glycerol, paraffin waxes, stearamide and finely dispersed polyethylene waxes.

* * * * *